US009544855B2

(12) United States Patent
Jeong et al.

(10) Patent No.: US 9,544,855 B2
(45) Date of Patent: Jan. 10, 2017

(54) METHOD AND APPARATUS FOR CONTROLLING POWER OF UPLINK IN A BEAM FORMING SYSTEM

(71) Applicant: Samsung Electronics Co., Ltd., Gyeonggi-do (KR)

(72) Inventors: Su-Ryong Jeong, Gyeonggi-do (KR); Jeong-Ho Park, Seoul (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/260,154

(22) Filed: Apr. 23, 2014

(65) Prior Publication Data

US 2014/0315594 A1 Oct. 23, 2014

(30) Foreign Application Priority Data

Apr. 23, 2013 (KR) .................. 10-2013-0044568

(51) Int. Cl.
| | | |
|---|---|---|
| *H04B 7/00* | (2006.01) | |
| *H04W 52/14* | (2009.01) | |
| *H04W 52/24* | (2009.01) | |
| *H04W 52/42* | (2009.01) | |
| *H04W 52/22* | (2009.01) | |
| *H04W 52/36* | (2009.01) | |
| *H04B 7/04* | (2006.01) | |

(52) U.S. Cl.
CPC ......... *H04W 52/146* (2013.01); *H04W 52/247* (2013.01); *H04W 52/248* (2013.01); *H04W 52/42* (2013.01); *H04B 7/0408* (2013.01); *H04W 52/225* (2013.01); *H04W 52/362* (2013.01)

(58) Field of Classification Search
USPC ............ 455/522, 69–70, 67.11, 67.13, 63.1, 13.3,455/13.4, 25, 63.4, 562.1; 370/310–320
See application file for complete search history.

(56) References Cited

U.S. PATENT DOCUMENTS

| | | | | |
|---|---|---|---|---|
| 7,742,788 B2 * | 6/2010 | Frank | ................... | H04B 7/0408 455/25 |
| 8,077,664 B2 * | 12/2011 | Zangi | ................ | H04L 25/03343 370/252 |
| 8,626,069 B2 | 1/2014 | Chae et al. | | |

(Continued)

FOREIGN PATENT DOCUMENTS

| | | |
|---|---|---|
| KR | 20090110050 A | 10/2009 |
| KR | 20110099035 A | 9/2011 |

(Continued)

OTHER PUBLICATIONS

International Search Report dated Aug. 14, 2014 in connection with International Patent Application No. PCT/KR2014/003571; 3 pages.

(Continued)

*Primary Examiner* — Fayyaz Alam

(57) ABSTRACT

A method and an apparatus for controlling power of an uplink in a beam forming system is disclosed. The method includes generating power control information based on a quality of a signal which is measured for each reception beam of a base station, so as to transmit the power control information to terminals. The method also includes receiving a signal transmitted by using the power control information from at least one terminal.

22 Claims, 8 Drawing Sheets

(56) References Cited

U.S. PATENT DOCUMENTS

| | | | |
|---|---|---|---|
| 8,995,916 B2* | 3/2015 | Tsutsui | H04B 7/0417 |
| | | | 455/575.7 |
| 2010/0150267 A1* | 6/2010 | Zangi | H04L 25/03343 |
| | | | 375/296 |
| 2010/0331036 A1 | 12/2010 | You et al. | |
| 2011/0158304 A1 | 6/2011 | Yang | |
| 2011/0319118 A1* | 12/2011 | Yu | H04W 52/40 |
| | | | 455/522 |
| 2012/0176915 A1 | 7/2012 | Lee et al. | |
| 2014/0087652 A1* | 3/2014 | Oh | H04B 7/2041 |
| | | | 455/9 |

FOREIGN PATENT DOCUMENTS

| | | |
|---|---|---|
| KR | 20120080327 A | 7/2012 |
| KR | 20120121299 A | 11/2012 |

OTHER PUBLICATIONS

Written Opinion of International Searching Authority Aug. 14, 2014 in connection with International Patent Application No. PCT/KR2014/003571; 4 pages.

Extended Euroepan Search Report dated Oct. 27, 2016 in connection with European Application No. 14788566.9, 3 pages.

Qualcomm Incorporated, "LTE-A UL Power Control", 3GPP TSG RAN WG4 #55, R4-102007, Montreal, Canada, May 10-14, 2010, 3 pages.

* cited by examiner

METHOD AND APPARATUS FOR CONTROLLING POWER OF UPLINK IN A BEAM FORMING SYSTEM

CROSS-REFERENCE TO RELATED APPLICATION(S) AND CLAIM OF PRIORITY

The present application is related to and claims the priority under 35 U.S.C. §119(a) to Korean Patent Application Serial No. 10-2013-0044568, which was filed in the Korean Intellectual Property Office on Apr. 23, 2013, the entire content of which is hereby incorporated by reference.

TECHNICAL FIELD

The present disclosure relates to a method and an apparatus for controlling uplink power in a beam forming system.

BACKGROUND

Currently, schemes for supporting high data rate in a wireless communication system have been researched in order to satisfy demand on increasing wireless data traffic. Currently, the fourth generation (4G) system which can be commercially available has been developed in a direction of improving spectral efficiency in order to increase the data rate. However, even though the spectral frequency efficiency can be improved, it can be difficult to satisfy the demand on the wireless data traffic which explosively increases.

A scheme of using a very wide frequency band can be considered as one method of solving the problem. However, since a frequency band used in the current wireless communication system can be equal to or lower than 10 GHz, it can be substantially very difficult to secure a wider frequency band considering current use of a frequency resource.

Further, as the frequency band used in the wireless communication system is raised, a path loss of an electric wave can increase. In addition, arrival time of the electric wave can be relatively short due to the path loss of the electric wave, which can result in a reduction of service coverage. In order to compensate for the disadvantage, a beam forming technology has been introduced as one of important technologies for reducing the path loss of the electric wave and increasing the arrival time of the electric wave. The beam forming technology can be a scheme of converging signals transmitted from every antenna in a specific direction by using a plurality of antennas. For a purpose of concentrating the signals, as an example, an array antenna can be used in which plural antenna elements are gathered. When a transmission side uses the beam forming technology, it can be possible to increase the arrival time of the signal and to remarkably reduce interference making an effect on other users because the signal is not transmitted in other directions excepting the corresponding direction. Similarly, when a reception side uses the beam forming technology, the beam forming technology enables the reception side to have improved sensitivity to a received signal. Further, the beam forming technology excludes interference signals, which are received from the directions excepting the corresponding direction, from the received signal, thereby interrupting the interference signals.

In the above-mentioned beam forming system, a deviation of interference can be increased in comparison with a mobile communication system to which the beam forming technology is not applied, according to a direction in which the received signal is converged and forms of beam forming in adjacent terminals for a uplink transmission, because the received signal can be converged in a specific direction in the uplink. Therefore, in the beam forming system, a scheme of controlling transmission power can be required considering the deviation of the interference which can occur in the uplink.

SUMMARY

To address the above-discussed deficiencies, it is a primary object to provide a method and an apparatus for controlling power of an uplink in a beam forming system, which are capable of generating information on the power of the uplink considering an average amount of noise and interference in each of a plurality of beams in a base station and each terminal, so as to control the power of the uplink based on the uplink power information.

In a first example, a method of controlling power of an uplink in a beam forming system is provided. The method includes generating power control information based on a quality of a signal which is measured for each reception beam of a base station, so as to transmit the power control information to terminals. The method also includes receiving a signal transmitted by using the power control information from at least one terminal.

In a second example, a method of controlling power of an uplink in a beam forming system is provided. The method includes receiving power control information which is generated based on a quality of a signal measured for each reception beam of a base station, from the base station. The method also includes calculating power by using the power control information after a scheduling result indicating an object to which an uplink signal is transmitted is received from the base station. The method further includes transmitting a signal to the base station by using the power.

In a third example, an apparatus configured to control power of an uplink in a beam forming system is provided. The apparatus includes a controller configured to control a transmission and reception unit to generate and transmit power control information to terminals based on a quality of a signal measured for each reception beam of a base station, and to receive the transmitted signal from at least one terminal by using the power control information.

In a fourth example, an apparatus configured to control power of an uplink in a beam forming system is provided. The apparatus includes a transmission and reception unit configured to receive power control information which is generated based on a quality of a signal measured for each reception beam of a base station, from the base station. The apparatus also includes a controller configured to control the transmission and reception unit to calculate power by using the power control information after a scheduling result indicating an object to which an uplink signal is transmitted is received from the base station, and to transmit a signal to the base station by using the power.

The present disclosure can generate information on the power of the uplink considering the average noise and the amount of the interference of each of plural beams in the base station and each terminal, so as to control the power of the uplink in the beam forming system based on the uplink power information. Further, the present disclosure applies an accurate noise and interference (NI) value to each of received beams of the base station, thereby controlling the power of the uplink which is optimized in the beam forming system. Accordingly, the terminal can prevent an unnecessary consumption of the uplink power and an increase of interference in a cell and improve a transmission rate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
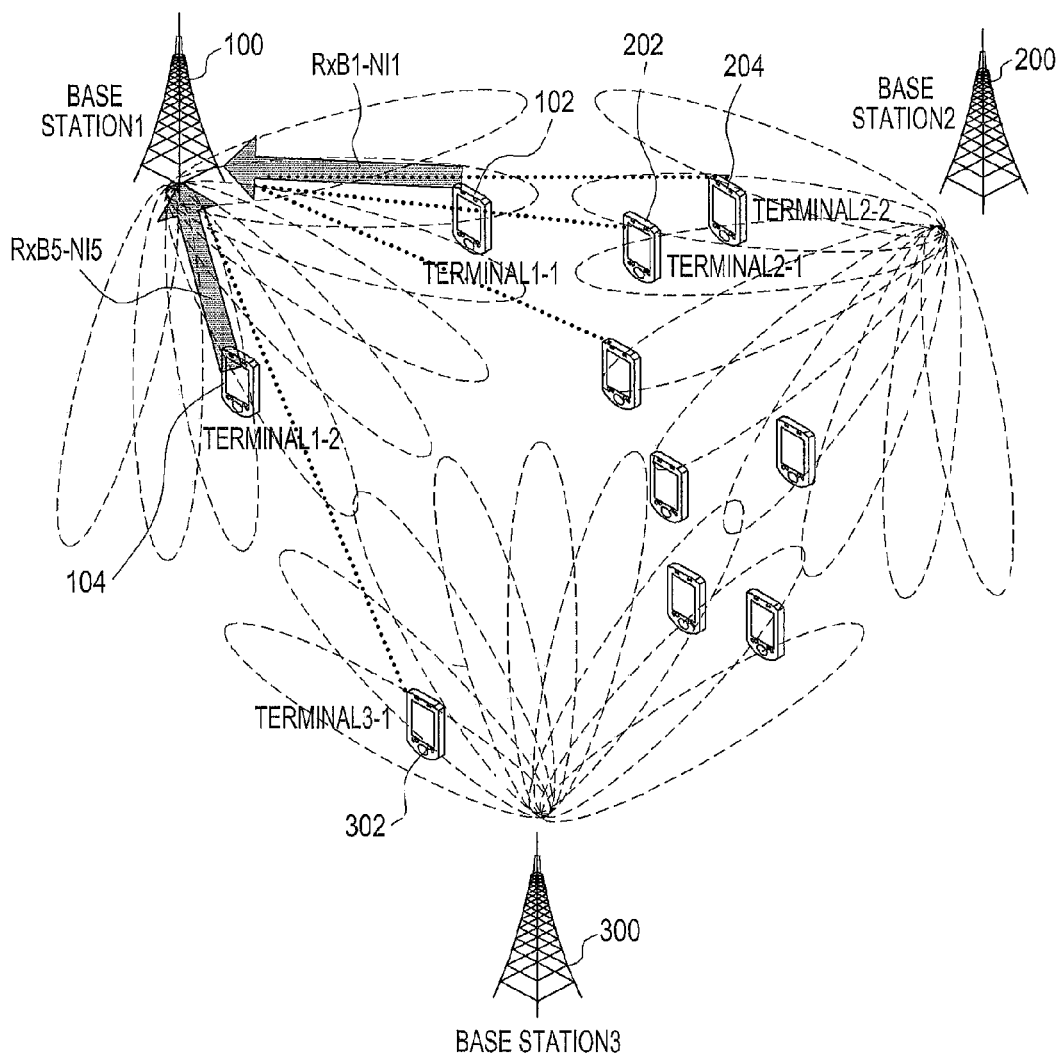
FIG. 1 is an example view illustrating an amount of interference caused in each received beam in a conventional beam forming system according to this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. Further, terms described later are defined in consideration of the functions of the present disclosure, but can vary according to the intention or convention of a user or operator. Accordingly, the terms should be defined based on the contents over the whole present specification.

Methods of controlling power of an uplink in a mobile communication system will be described before the description of the present disclosure.

As an example, in the 4th generation based mobile communication system, the power of the uplink can be calculated by Equation (1).

$$P_{TX} = PL + NI + SINR_{Target} \qquad (1)$$

Herein, a path loss (PL) can indicate a reduction of an uplink signal until the uplink signal transmitted from a terminal is received in a base station, and noise and interference (NI) can denote an average amount of noise and interference which the uplink signal includes. The PL and NI can be specifically determined in each cell. In addition, a SINRTarget can indicate a target value of a signal to noise and interference ratio (SINR) when a terminal receives the uplink signal of the base station. The base station can continuously measure an uplink pilot symbol or a corresponding beam, or intensity of a signal in an area in which an uplink for the base station is not allocated, so as to obtain a time average value of NI for a predetermined time. Accordingly, it can be possible to estimate an NI value based on the time average value of the NI when the uplink signal is transmitted.

As another example, in a mobile communication system based on long term evolution (LTE), power for a physical uplink shared channel (PUSCH) can be defined by Equation (2) below.

$$P_{TX} = \alpha(j) \cdot PL_c + P_{O_{PUSCH,c}}(j) + \Delta_{TF,c}(i) + f_c(i) \qquad (2)$$

$$P_{O_{PUSCH,c}}(j) = P_{O_{NOMINAL_{PUSCH,c}}}(j) + P_{O_{UE_{PUSCH}}}(j)$$

Herein, $\alpha(j)$ can indicate a compensation value for a path loss, and j can be an index value indicating a transmission mode. $PL_c$ can indicate a compensation value for a path loss of a corresponding uplink, and c can denote an index of a sub carrier used for a corresponding transmission or a cell to which a signal is transmitted. Further, $P_{O_{PUSCH,c}}(j)$ can indicate a specific power value applied when power of an uplink of the PUSCE is controlled, and particularly can be calculated by a sum of $$P_{O_{NOMINAL_{PUSCH,c}}}(j)$$

and $$P_{O_{UE_{PUSCH}}}(j)$$

in Equation (2). The $$P_{O_{NOMINAL_{PUSCH,c}}}(j)$$

can indicate a specific base station value which is commonly applied to terminals performing the uplink toward the base station, and $$P_{O_{UE_{PUSCH}}}(j)$$

can indicate a specific terminal value which is individually applied to each of the terminals. Further, $\Delta TF,c(i)$ can be a value related to a transmission rate such as modulation and coding scheme (MCS) when a corresponding uplink is transmitted, and fc(i) can indicate a value applied in a closed loop type power control.

In other words, the NI value in Equation (1) and values of $$P_{O_{NOMINAL_{PUSCH,c}}}(j)$$

and $$P_{O_{UE_{PUSCH}}}(j)$$

in Equation (2) can be semi-static index values, and can be transmitted from the base station through a broadcasting or control channel by predetermined periods in order to control uplink power of the) terminal. Moreover, the NI and $$P_{O_{NOMINAL_{PUSCH,c}}}(j)$$

can be used as power control parameters for a reduction of interference received along with the uplink signal in the base station.

However, in the conventional beam forming system, since a plurality of beams of the base station and every terminal is used, a channel condition of each path for a reception beam of the base station and a transmission beam of the terminal can cause a different amount of interference.

FIG. 1 is an example view illustrating an amount of interference caused in each reception beam in a conventional beam forming system according to this disclosure.

Referring to FIG. 1, a total of three cells is shown as an example. A first base station 100 can administer service coverage of a first cell in which plural terminals 102 and 104 are located. Also, a second base station 200 can administer service coverage of a second cell in which plural terminals including a terminal 202 and a terminal 204 are located. Finally, a third base station 300 can administer service coverage of a third cell in which plural terminals including a terminal 302 are located.

Assuming that the first cell is applied to a mobile communication system which does not support the beam forming technology, the first base station 100 can receive an uplink signal only through one reception beam or reception area from the terminals located in the service coverage thereof. As such, in this case, when the base station receives the uplink signal, the base station can recognize the same interference value for the terminals 102 and 104 because of a signal transmission of the terminals in adjacent cells.

On the other hand, it can be assumed that the first base station 100 in the first cell has a plurality of beams and applies various kinds of beam forming for received signals through the beams in cell coverage. In this case, an NI value of the first base station 100 applicable to each reception beam can be different. As a particular example, it can be assumed that the first base station 100 applies a first reception beam RxB1 to an uplink signal when the terminal 102 transmits the uplink signal, and a fifth reception beam RxB5 to an uplink signal when the terminal 104 transmits the uplink signal.

In the case of the RxB1, the first base station 100 can receive relatively higher interference signals together with the uplink signal of the terminal 102 because a large number of terminals including the terminals 202 and 204, which can transmit an interference signal, are located around the RxB1. In the case of the RxB5, a relatively small number of terminals, which can transmit the interference signal, can be located around the RxB5, compared with the RxB1. Accordingly, an average amount of the interference NI1 of the reception beam RxB1 can be greater than an average amount of the interference NI5 of the reception beam RxB5.

It can be assumed as a particular example that the beam forming system applied to the first cell uses a transmission frequency of 28 GHz and a transmission band of 1 GHz, the first base station 100 can have seven reception array antennas, and each of the terminals located in the first cell can include four transmission array antennas. In this case, under an assumption that an inter-site distance (ISD) from the first base station 100 to the adjacent base stations, such as the second base station 200 and the third base station 300, can be 200 m, a system level simulation can be performed in a multi-cell environment including the first, second and third cells. Table 1 indicates a time average value of NI of each reception beam of the first base station 100.

TABLE 1

| ID of received beam | Time average NI value (dBm) | Max-Min |
|---|---|---|
| 0 | −60.8208 | (1) Max NI value: −48.0572 |
| 1 | −59.0038 | (2) Min NI value: −60.8208 |
| 2 | −57.9449 | (Exam.) difference of time average NI value entire reception beams can be equal to 12.7636 |
| 3 | −57.4153 | |
| 4 | −56.8616 | |
| 5 | −56.5353 | |
| 6 | −56.0053 | |
| 7 | −55.6588 | |
| 8 | −54.9299 | |
| 9 | −53.967 | |
| 10 | −51.0621 | |
| 11 | −49.7468 | |
| 12 | −49.4201 | |
| 13 | −49.0921 | |
| 14 | −48.9304 | |
| 15 | −48.0572 | |

Referring to Table 1, the maximum value among the time average NI values of the reception beams which the first base station 100 has can correspond to "about −48 dBm" which can be the time average NI value of the reception beam identification (ID) #15. Further, the minimum value among the time average NI values of the reception beams can correspond to "about −61 dBm" which can be the time average NI value of the reception beam identification (ID) #0. That is, the maximum difference between the NI values of the reception beams of the first base 100 can be about 13 dBm. In this circumstance, when a control of power is performed by applying an identical NI value to every reception beam, an error can occur in estimation of intensity of a reception signal, thereby causing a degradation of the transmission rate.

Therefore, when the power of the uplink can be controlled in the beam forming system, an amount of interference differently generated from every path for plural transmission and reception beams as well as a specific value of an existing cell or a terminal also can be considered.

Accordingly, the present disclosure proposes a method and an apparatus for controlling power of an uplink in a beam forming system, considering an NI value caused by at least one of a reception beam of a base station and a transmission beam of a terminal which can configure a transmission path for an uplink signal.

In a first embodiment, the base station can transmit an NI value of each reception beam for a transmission of the uplink signal and an identification of the reception beam mapped on the corresponding NI as information on a control of the uplink power to a corresponding terminal. The terminal according to the first embodiment, which receives the information on the control of the uplink power, can calculate the uplink power by using the information, and then can transmit the uplink signal to the base station by using the calculated uplink power.

Figure 2:
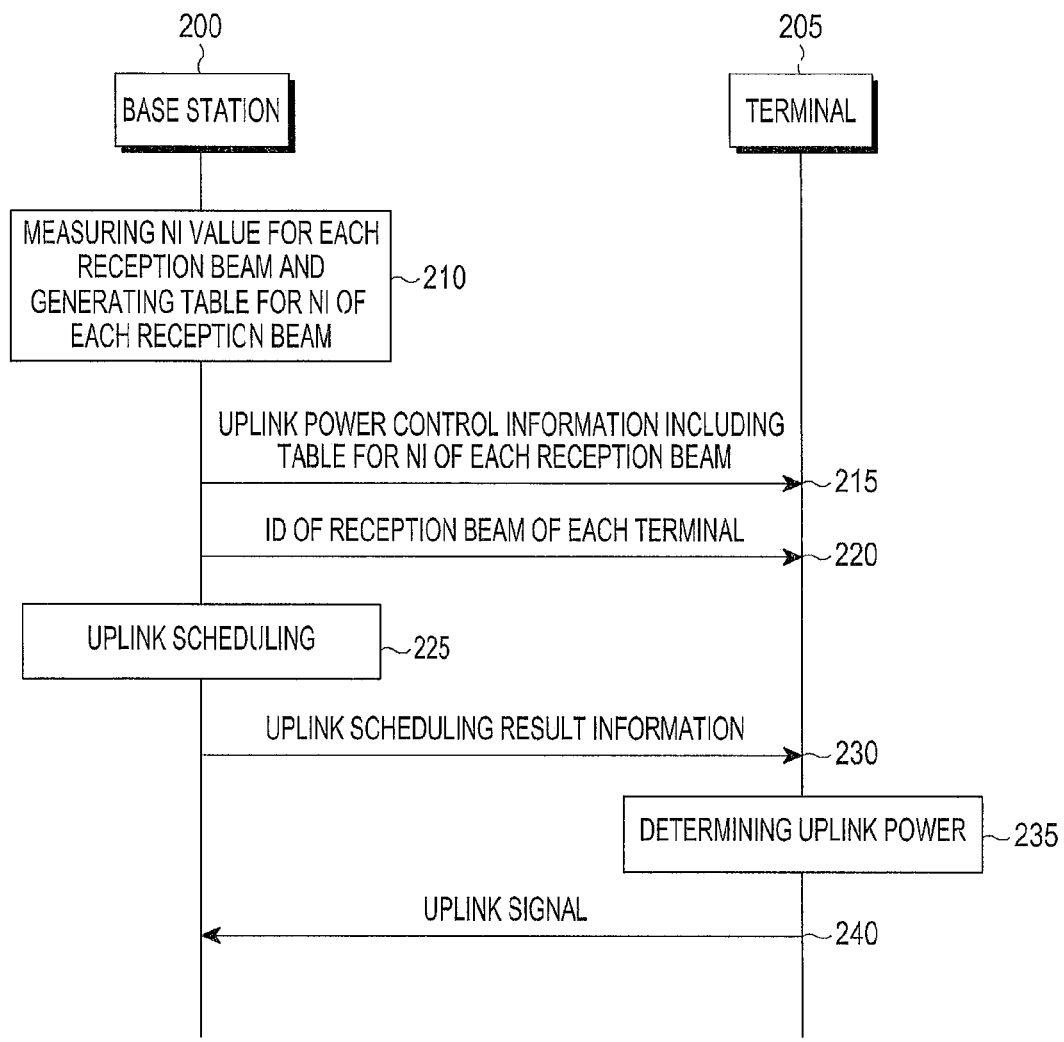
FIG. 2 is an example flowchart illustrating an operation of a base station and a terminal according to this disclosure.

FIG. 2 is an example flowchart illustrating an operation of a base station and a terminal according to this disclosure.

Referring to FIG. 2, the base station 200 can measure NI for each reception beam thereof in step 210. The base station 200 can determine the NI value of each reception beam in a similar manner to processes of measuring the NI in the conventional base station. As an example, the base station 200 can measure an amount of interference of neighboring cells which is received in an area in which a signal cannot be received, with respect to each reception beam, so as to measure the NI of each of corresponding reception beam. As another example, the base station 200 can calculate the NI value of each corresponding reception beam by using a feedback of a terminal for a pilot pattern received through the corresponding reception beam.

In step 215, next, the base station 200 can broadcast the uplink power control information including the NI values of the reception beams thereof to all terminals located in the service coverage through a broadcasting channel or a control channel. Herein, the uplink power control information can be transmitted by including it in a conventional media access control (MAC) or a separate MAC.

Table 2 indicates the NI value of each reception beam in the uplink power control information as an example, in which each NI value can be mapped to an identification ID of each reception beam.

TABLE 2

| ID of received beam | #0 | #1 | #2 | #3 | ... ... | #N-1 |
|---|---|---|---|---|---|---|
| NI'(b) [dBm] | −93 | −100 | −120 | −80 | ... ... | −60 |

In this case, the NI value of each reception beam can be transmitted by the base station 200 by predetermined periods or aperiodically.

Then, before performing an uplink scheduling, in step 220, the base station 200 can transmit a reception beam identification (ID) receiving an uplink signal of each terminal as the uplink power control information to the corresponding terminal. Herein, it can be assumed that at least one terminal transmits an uplink signal through each reception beam. If two or more terminals transmit the uplink signal through one reception beam, the base station can group the terminals as a group of the terminals transmitting the reception beam ID, and transmit the identical reception beam ID to each of the grouped terminals.

In step 225, the base station 200 can perform an uplink scheduling for determining a terminal to which an uplink signal is substantially transmitted, among the terminals. As the result of the uplink scheduling, it can be assumed that the terminal 205 is determined as the terminal which transmits the uplink signal. The uplink scheduling can be identical to a general uplink scheduling determined based on feedback information of a terminal for the pilot signal transmitted by the base station 200. Accordingly, the detailed description will be omitted.

Then, in step 230, the base station 200 can transmit information on the uplink scheduling result to the terminal 205.

Continuously, in step 235, when the terminal 205 receives the information on the uplink scheduling result, the terminal 205 can recognize itself to be a terminal which transmits the uplink signal to the base station 200. Further, the terminal 205 can calculate the power of the uplink from the NI table broadcasted in step 215 by using the NI value mapped to the reception beam ID which the base station 200 unicasts in step 220. As a particular example, it can be assumed that a beam identifier which the terminal receives is #1. In this case, the terminal can calculate the power of the uplink by applying an NI' (b) value, such as −100, mapped to the beam identifier #1 thereof in table 2 to Equation 3.

$$P_{TX}(b) = PL + NI'(b) + SINR_{Target} \quad (3)$$

Herein, PTx(b) can indicate an uplink power control value of the terminal according to the reception beam b of the base station, NI'(b) can be a specific NI value of each reception beam, and b can be an ID of the reception beam.

In step 240, the terminal 205 can transmit the uplink signal to the base station 200 by using the calculated uplink power.

In a second embodiment, the base station can transmit an average NI value of all reception beams and an average NI offset of each reception beam as uplink power control information to a corresponding terminal.

The base station can continuously measure intensity of a signal in a section in which the uplink signal is not allocated to the pilot symbol of each reception beam or a corresponding reception beam, so as to obtain the time average NI value of each reception beam for a desired time and to estimate the average NI value representative of each reception beam with reference to a corresponding value. In this case, in the method of obtaining an average NI value representative of each reception beam using the time average NI value of each reception beam, the time average NI value of each reception beam can be indicated as one representative average NI value by using an average value of the time average NI values of every reception beam, or the maximum value and the minimum value of the NI of the corresponding reception beam.

The average NI offset of each reception beam can be defined as a compensation value for the NI value of each reception beam with reference to the average NI value. Similarly, the terminal collecting the uplink power control information according to the second embodiment can calculate the uplink power by using the information, and then transmit the uplink signal to the base station by using the calculated uplink power.

Figure 3:
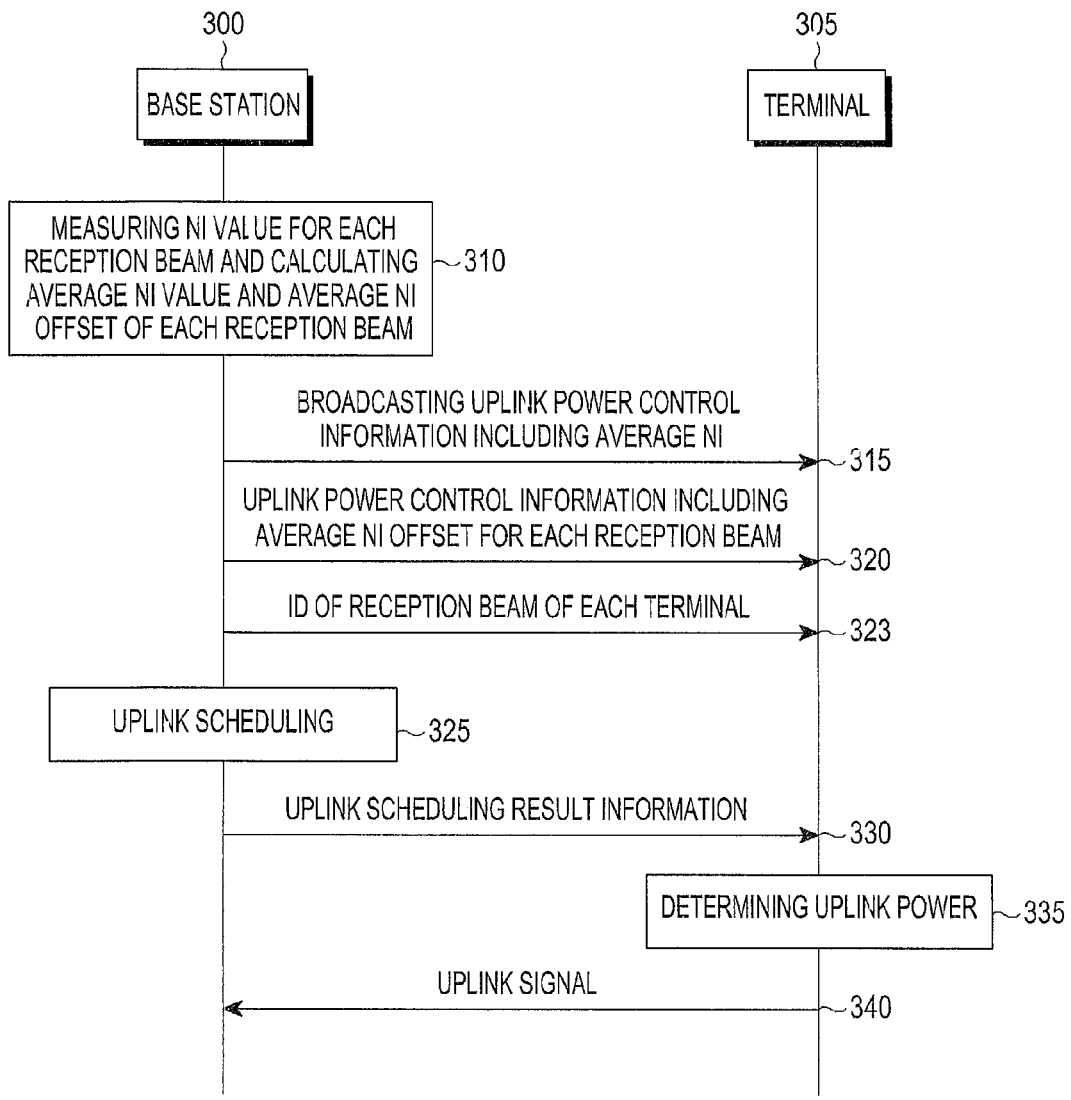
FIG. 3 is an example flowchart illustrating an operation of a base station and a terminal according to this disclosure.

FIG. 3 is an example operation flowchart according to this disclosure.

Referring to FIG. 3, in step 310, the base station 300 can measure an NI for all reception beams thereof, and calculate an average NI value. Herein, the process in which the base station 300 can determine the NI values of every beam can also be identical to the process in step 201. Accordingly, a duplicate description will be omitted.

In step 315, the base station 300 can transmit the uplink power control information including the average NI value through a broadcasting channel or a control channel by predetermined periods. In this event, the average NI vale can be transmitted in a state that it is included in an existing MAC message or a separate MAC message.

On the other hand, in a general cellular system, an identical NI value can be transmitted to all terminals as described above, but an update of a fast period may not be required. However, in the beam forming system, different NI values can be applied to the reception beam respectively, and an update of the NI values by shorter periods may be required. A time point at which the update is required can be determined in proportion to the periods by which the NI value is changed when the base station determines the NI of each reception beam. Therefore, the base station can transmit an NI offset value of each reception beam by periods or aperiodically, in order to transmit information on a variation of the NI value to the terminals in the corresponding base station.

As described above, in step 315, the base station 300 can broadcast the NI offset value of each reception beam as a difference of the NI value of each reception beam by reference of the average NI value to all terminals located in the coverage thereof through a broadcasting channel or a control channel. At this time, the NI offset of each reception beam can be transmitted in the form of a table in which the NI offset is mapped to the ID of each reception beam.

The transmission of the NI offset value of each reception beam in step 320 can have an advantage of reducing a transmission overhead compared to a transmission of a real number value of the NI of each reception beam. In addition, when the NI value of each reception beam is updated by a shorter period in order to correspond to the variation of the NI value of each reception beam, it can be possible to minimize an increase of the overhead.

In an embodiment, it can be assumed that the base station 300 transmits the average NI value by relatively long periods, such as by periods of 100 mse, in step 315. When the base station 300 transmits the uplink power control information including the NI offset value of each reception beam by periods shorter than the long periods, such as by periods of 10 msec, in step 320, it can be possible to transmit accurate information on the NI of each reception beam by shorter periods although a small amount of the overhead can be used.

An embodiment in which the NI value of each reception beam is updated by using the average NI value in step 315 and the NI offset value of each reception beam by shorter periods in step 320 will be described.

In at least the first embodiment, the NI value of the reception beam can be calculated by applying the NI offset value of each reception beam by each short period to the reception beam by reference of the average NI value of step 315. In an embodiment, it can be assumed that the average NI value transmitted in step 315 is, for example, −100 dBm, and information on the NI offset of each reception beam initially received in step 320 can be received, for example, like in Table 3 below. As indicated in Table 3, the NI value of a reception beam #0 to which the NI offset is applied can be adjusted as −110 dBm, and the NI value of a reception beam #1 to which the NI offset is applied can be adjusted as −108 dBm. Further, assuming that the uplink power control information additionally received in step 320 has a value indicated in Table 3, the NI values of the reception beam #0 and the reception beam #1 can be adjusted as −110 dBm and −108 dbm respectively by applying the NI offset information to the reception beams #0 and #1 by reference of the NI value, such as −100 dBm, of the beam initially received in step 315.

In at least the second embodiment, the NI value of each reception beam can be updated by accumulating the NI offset value of each reception beam by each short period by reference of the average NI value of step 315. In an embodiment, it can be assumed that the average NI value transmitted in step 315 is, for example, −100 dBm, and information on the NI offset of each reception beam initially received in step 320 is received, for example, like in Table 3 below. In this case, the NI value of the reception beam #0 can be adjusted as −110 dBm, and the NI value of the reception beam #1 can be adjusted as −108 dBm. Then, assuming that the NI offset information of each reception beam of step 320 is received like in Table 3, the NI offset value can be accumulated in the adjusted NI value of −110 dBm of the reception beam #0 by −10 dB, and the NI value of the reception beam #0 can be adjusted as −120 dBm. Finally, the NI offset value can be accumulated in the adjusted NI value of −108 dBm of the reception beam #1 by −8 dB, and the NI value of the reception beam #1 can be adjusted to −116 dBm again.

TABLE 3

| ID of received beam | #0 | #1 | #2 | #3 | ... | ... | #N-1 |
|---|---|---|---|---|---|---|---|
| ΔNI(b) [dB] | −10 | −8 | −2 | +4 | ... | ... | +10 |

Then, in step 323, the base station 300 can unicast uplink resource allocation information or uplink power control information including its reception beam ID through which the base station 300 receives an uplink signal from a corresponding terminal to each of the terminals. Herein, it is assumed that there can be at least one terminal which transmits an uplink signal through each reception beam. If two or more terminals transmit the uplink signal through one reception beam, the base station can group the terminals as a group of the terminals transmitting the reception beam ID, and transmit the identical reception beam ID to each of the grouped terminals.

In step 325, the base station 300 can perform an uplink scheduling for determining an object terminal which substantially transmits an uplink signal, among the terminals. As the result of the uplink scheduling, it can be assumed as an example that the terminal 305 can be determined as the terminal which transmits the uplink signal. Then, in step 330, the base station 300 can transmit information on the uplink scheduling result to the terminal 305.

Continuously, in step 335, when the terminal 305 receives the information on the uplink scheduling result, the terminal 205 can recognize itself to be a terminal which transmits the uplink signal to the base station 300. Accordingly, the terminal 305 can identify the NI offset corresponding to the reception beam ID among the NI offset for each reception beam which is received in step 320. The terminal 305 can calculate the power of the uplink by using the identified NI offset and the average NI value obtained through step 315, according to Equation (4) or (5).

$$P_{TX}(b) = PL + NI + \Delta NI(b) + SINR_{Target} \quad (4)$$

$$P_{TX}(b) = \alpha(j) \cdot PL_c + P_{O_{PUSCH,c}}(j) + \Delta NI(b) + \Delta_{TF,c}(i) + f_c(i) \quad (5)$$

In the Equations, PTx(b) can indicate an uplink power control value of a terminal according to the reception beam b of the base station. NI can denote an average NI of all reception beams of the base station received in step 315, and ΔNI(b) can be an offset value of each reception beam obtained by using the NI offset value of each reception beam received in step 320, which can be calculated as a difference between the average NI and the NI of the received beam B.

Particularly, in at least the case of the first embodiment of two embodiments for the update of the NI value as described above, the NI offset value of each reception beam received in step 320 can be applied to the NI value as it is, and can be expressed by Equation (6).

$$\Delta NI(b) = NI_{OFFSET}(b) \qquad (6)$$

In Equation (6), NIOFFSET(b) can indicate an NI offset value of each reception beam recently received.

In at least the case of the second embodiment of two embodiments for the update of the NI value, the NI offset value of each reception beam received in step 320 can be accumulated and applied to the NI value, and can be expressed by Equation (7).

$$\Delta NI(b) = \Sigma_i NI_{OFFSET}(b, i) \qquad (7)$$

In Equation (7), i can denote an index of information on an NI offset of each reception beam received after an average NI value is received. NIOFFSET(b, i) can indicate an NI offset value for the reception beam b corresponding to the NI offset information of ith reception beam after the average NI value is received. Accordingly, in Equation (7), ΔNI(b) can be an accumulated value of the NI offset information of each reception beam received after the average NI value is received.

On the other hand, in the beam forming system, the terminals located in the service coverage of the base station as well as the base station can also include a plurality of beams and perform the beam forming. In this case, when the terminal transmits an uplink signal by using at least one transmission beam, the base station receiving the uplink signal can receive a different beam from the transmitted beam used by the terminal.

Figure 4A:
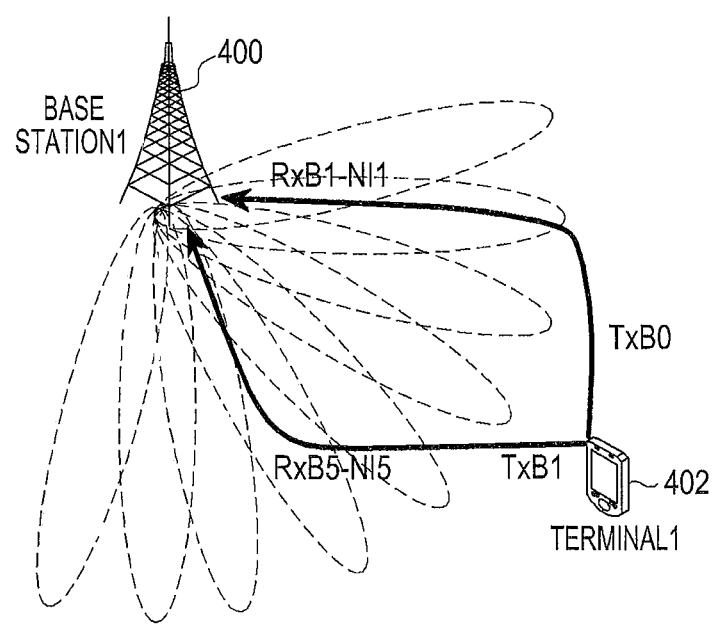
FIG. 4A is an example view illustrating use of a beam of each terminal and a base station emitting a plurality of beams according to this disclosure.

FIG. 4A is an example view illustrating use of a beam of each terminal and a base station including a plurality of beams in the uplink according to this disclosure.

Referring to FIG. 4A, it can be assumed as an example that a first terminal 402 which is one of terminals located in the service coverage of the base station 400 transmits the uplink signal by using two different transmission beams TxB0 and TxB1. Further, it can be assumed that optimal reception beams RxB1 and RxB5 of the base station are selected for the uplink signal which is transmitted through the transmission beams TxB0 and TxB1. In this case, different time averages of NI can be applied to a combination of two transmission beams according to an interference circumstance of a corresponding channel with a neighboring channel. As an example, it can be assumed that a time average amount of interference NI1 is applied to the uplink of the transmission beams TxB0 and RxB1 while a time average amount of interference NI5 is applied to the uplink of the transmission beams TxB1 and RxB5. That is, in the case that the uplink signal is transmitted through a path mapped to a different reception beam corresponding to each transmission beam although transmission beams are transmitted by an identical terminal, the uplink power can be used for each combination of corresponding transmission and reception beams. In a particular example, the uplink power of each of TxB0 and TxB1 can be calculated by Equations (8) and (9).

$$P_{TX}(TxB0) = P_{TX}(RxB1) = PL_{TxB0-RxB1} + NI'(RxB1) + SINR_{Target} \qquad (8)$$

$$PT_{X(TxB1)} = P_{TX(RxB5)} = PL_{TxB1-RxB5} + NI'(RxB5) + SINR_{Target} \qquad (9)$$

That is, Equation 8 can be a formula of calculating the power of the uplink signal which the first terminal 402 transmits to the RxB1 of the base station 400 by using the TxB0. Further, Equation 9 can be a formula of calculating the power of the uplink signal which the first terminal 402 transmits to the RxB5 of the base station 400 by using the TxB1.

In a fourth embodiment, each reception beam of the base station mapped for a transmission path of the uplink signal can be determined with respect to each of the transmission beams which each terminal has, based on the communication system in which the base station and the terminal use at least one beam respectively. When the transmission beam is determined with respect to each reception beam, uplink power control information can be generated considering the NI caused by neighboring interference in each path including a combination of corresponding transmission and reception beams. Particularly, the base station can calculate the NI value of each reception beam like in the first embodiment. Further, the base station can calculate the NI offset of the reception beam for compensating for the NI value based on the NI value of each reception beam, considering the neighboring interference occurring in a path of the transmission beam mapped to the corresponding reception beam. Then, at step 340, the base station can transmit the NI offset of the reception beam as the uplink power control information. The NI offset of the reception beam according to at least the fourth embodiment can be distinguished from the NI offset of the reception beam of at least the second embodiment in that the NI offset of each transmission beam mapped to the corresponding reception beam can be calculated. Accordingly, the terminal can calculate the uplink transmission power for the corresponding reception beam by using the NI value and the NI offset of each reception beam which are previously received through the broadcasting channel or the control channel of the base station.

Figure 4B:
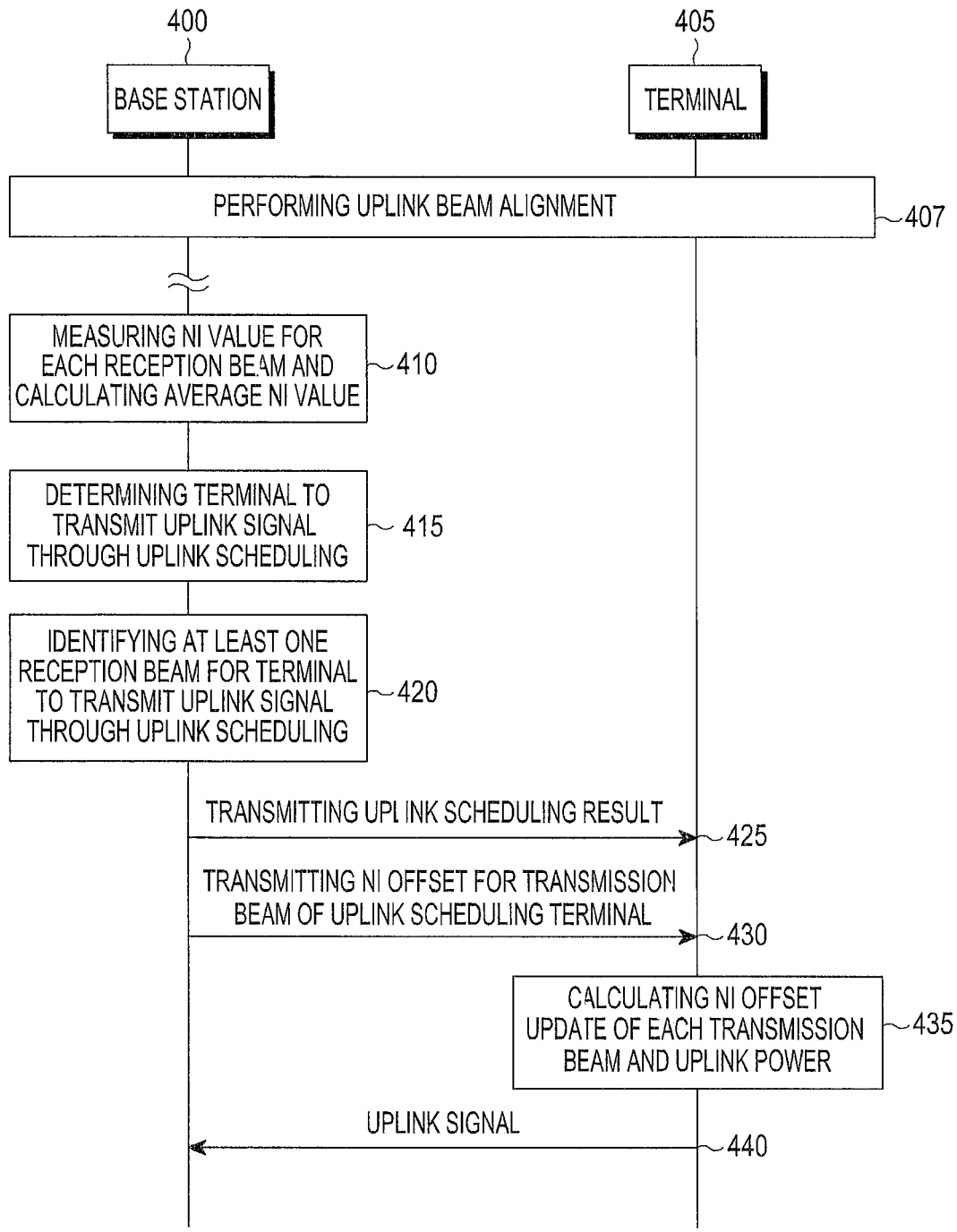
FIG. 4B is an example flowchart illustrating an operation of a base station and a terminal according to this disclosure.

FIG. 4B is an example flowchart illustrating an operation of a base station and a terminal according to this disclosure.

Referring to FIG. 4B, in step 407, the base station 400 can perform a process of aligning an uplink beam for the terminals located in the service coverage thereof. At this time, in the process of aligning the uplink beam, the base station can designate a path according to a combination of the transmission beam of the corresponding terminal among the terminals, which has the maximum intensity of at least one signal, and the reception beam of the base station, or a path according to a combination of the transmission beam of the corresponding terminal which has a condition satisfying at least one specific value and the reception beam of the base station, as a path of the uplink signal of the corresponding terminal. In this event, the processes of aligning the beam and designating the path according to the combination of the transmission beam of at least one terminal and the reception beam of the base station may not correspond to the subject matter of the present disclosure. Therefore, the description of the processes will be omitted.

On the other hand, in step 410, the base station 400 can measure and obtain the NI of each reception beam, and calculate the average value of the NI values of the reception beams. The process of calculating the average NI value can duplicate the process in step 210 of FIG. 2 and in step 310 of FIG. 3. The average NI value can be broadcasted as the uplink power control information. In this case, the uplink power control information also can be transmitted through the existing MAC message or the separate MAC message, similar to the previous embodiments.

In step 415, the base station 400 can determine a terminal to transmit the uplink signal through the uplink scheduling. The uplink scheduling can duplicate the process described from step 225 of FIG. 2 to step 325 of FIG. 3. Therefore, the description of the uplink scheduling will be omitted. As the result of the uplink scheduling, it can be assumed as an example that the terminal 405 is determined as the terminal which transmits the uplink signal.

In step 420, the base station 400 can identify the reception beam and the transmission beam corresponding to at least one combination determined in the process of aligning the uplink beam in step 407, with respect to the terminal 405 to which an allocation can be determined through the uplink scheduling. Further, for at least one combination, the base station 400 can calculate a difference of the NI value of the reception beam of the base station 400 constituting the combination and the average NI value as the NI offset of each transmission beam, based on the transmission beam of the terminal 405 constituting the corresponding combination.

Then, in step 425, the base station 400 can transmit the uplink scheduling result for the terminal 405 determined in step 415. Next, in step 430, the base station 400 can transmit the NI offset value of the reception beam of each transmission beam of the terminal 405 determined in step 415 along with the corresponding transmission beam ID. In this event, in step 430 according to an embodiment, a base station can simultaneously transmit an NI offset value along with an uplink scheduling result of step 425. In step 430 according to an embodiment, a base station can transmit an NI offset value of a reception beam for each transmission beam and a transmission ID along with an average NI value calculated in step 410. In this case, the uplink scheduling result can be as an example like in Table 4.

TABLE 4

| Transmission beam ID of terminal | #0 | #1 |
| Reception beam ID of base station | #1 | #5 |
| ΔNI(b) [dB] | −10 | −8 |

That is, the base station can manage the uplink power control information for each combination of the terminal 405 determined in the process of aligning the uplink beam, as indicated in Table 4. For example, the base station 400 can set paths of the reception beam IDs #1 and #5 of the base station 400 for the transmission beam IDs #0 and #1 of the terminal 405. In this case, '−10' and '8' which are the NI offset values ΔNI(b) of each corresponding transmission beam can be mapped in each path. In step 435, the terminal 405 can update the NI of each transmission beam thereof through a following process by using information on the average NI in step 410, the uplink scheduling result in step 420, and the transmission beam ID and information on the NI offset of each transmission beam in step 430.

In at least the first embodiment, in step 415, the terminal 405 can apply the NI offset result of each transmission beam which is received recently, or received along with each uplink scheduling result or just after the uplink scheduling result is received, to the average NI based on the information on the average NI, and calculate the uplink power for the corresponding transmission beam. In at least the second embodiment, in step 415, the terminal 405 can apply a value, which is updated by accumulating the information on the average NI and the NI offset value of the transmission beam which is received through a continuous allocation just after the information on the average NI is received, to the average NI, thereby calculating and updating the uplink power of the transmission beam of the terminal 405.

Then, the terminal 405 can apply the updated NI value of each transmission beam and calculate the uplink transmission power of the corresponding transmission beam. In step 440, the terminal 405 can transmit the uplink signal through the corresponding path by using the calculated uplink transmission power of each path.

Figure 5:
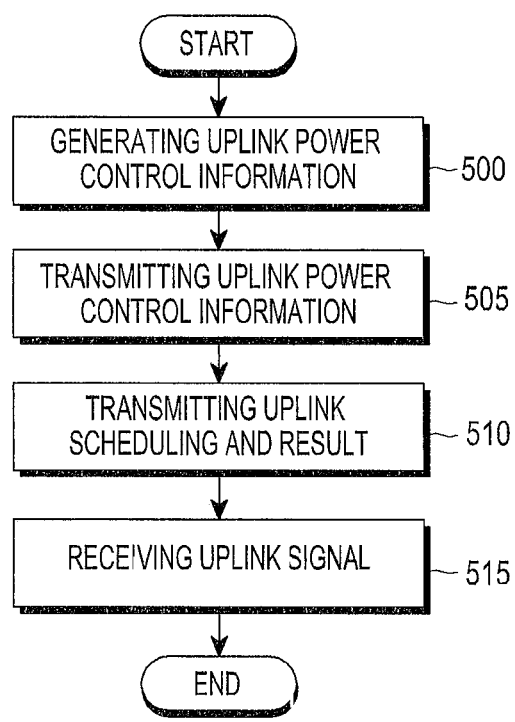
FIG. 5 is an example flowchart illustrating an operation of a base station according to this disclosure.

FIG. 5 is an example flowchart illustrating an operation of a base station according to this disclosure.

Referring to FIG. 5, in step 500, the base station can generate uplink power control information. Particularly, in the case of the first embodiment, the base station can generate the NI value of every reception beam thereof as the uplink power control information to be broadcasted to all terminals in the service coverage. In at least the second embodiment, the base station can calculate the average NI for the NI values of all reception beams, and generate the 'average NI' and an 'average NI offset' of each reception beam based on the average NI as the uplink power control information. In at least the fourth embodiment, the base station can calculate the NI and the average NI of every reception beam, and then calculate an NI offset of each transmission beam used for compensating the NI, considering neighboring interference occurring in each path selected for the transmission of the uplink signal. Continuously, the base station can generate the uplink power control information including the transmission beam ID constituting the corresponding path and the transmission beam NI offset.

In step 505, the base station can transmit the uplink power control information. In this event, the base station according to at least the first embodiment can broadcast the NI value of every reception beam among the uplink power control information to all the terminals, and can unicast the reception beam ID of the corresponding terminal to the corresponding terminal. The base station according to at least the second embodiment can broadcast the NI value and the average NI offset among the uplink power control information to all the terminals, and can unicast the reception beam ID of the corresponding terminal to the corresponding terminal. In at least the fourth embodiment, the base station can unicast the NI offset of the transmission beam of each path and the transmission and reception beam ID mapped to the NI offset as the uplink power control information to the corresponding terminal.

In step 510, the base station can perform an uplink scheduling for determining at least one terminal to transmit the uplink signal among the terminals located in the service coverage thereof, and can transmit the result to the corresponding terminal.

In step 515, the base station can receive the uplink signal from at least one terminal determined through the uplink scheduling. In this event, the uplink signal can be transmitted through the uplink transmission power calculated based on the uplink power control information received by the corresponding terminal. The uplink transmission power calculated based on the uplink power control information will be described in detail with reference to FIG. 6.

Figure 6:
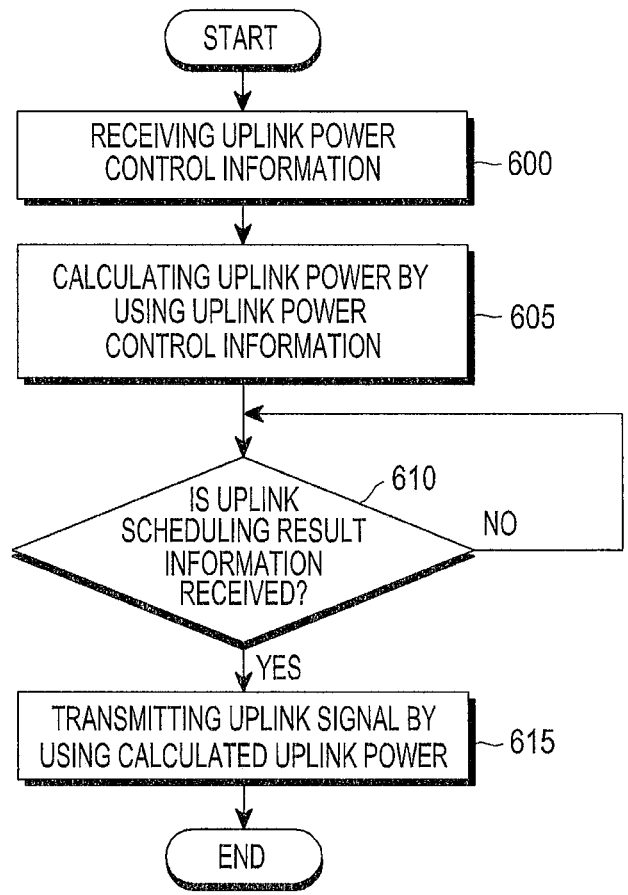
FIG. 6 is an example flowchart illustrating an operation of a terminal according to this disclosure.

FIG. 6 is an example flowchart illustrating an operation of a base station according to this disclosure.

Referring to FIG. 6, in step 600, the terminal can receive the uplink power control information from the base station. In this case, the uplink power control information according to at least the first and second embodiments can include information received as common information through the control channel or the broadcasting channel, and unicasted information. Then, the uplink power control information according to at least the fourth embodiment can be unicasted.

In step 605, the terminal can calculate the uplink transmission power by using the uplink power control information. Particularly, having received the uplink power control information according to at least the first embodiment, the terminal can identify the reception beam ID unicasted by the base station. Then, the terminal can calculate the uplink power by using the NI value of the reception beam mapped to the identified reception beam ID among the NI values of all reception beams broadcasted by the base station. Having received the uplink power control information according to at least the second embodiment, the terminal can identify the reception beam ID unicasted by the base station. Then, the terminal can calculate the uplink power by using the average NI offset value and the average NI of the reception beam mapped to the identified reception beam ID among the average NI offset values and the average NIs of all reception beams broadcasted by the base station. Having received the uplink power control information according to at least the fourth embodiment, the terminal can identify the reception beam ID and the transmission beam ID unicasted by the base station. Next, the terminal can apply the NI offset of the transmission beam mapped to the transmission beam ID to the NI value corresponding to the average NI or the reception beam ID, so as to calculate the uplink transmission power.

In step 610, the terminal can determine whether the uplink scheduling information indicating itself as an object to which the base station transmits the uplink signal is received. As the result of the determination, if the uplink scheduling information is not received, the terminal can wait for a reception of the uplink scheduling information.

As a result of the determination, if the uplink scheduling information is received, in step 610, the terminal, in step 615, can transmit the uplink signal to the base station by using the calculated uplink transmission power. In at least the first and second embodiments, the terminal can transmit the uplink signal by using the reception ID unicasted by the base station. In at least the fourth embodiment, the terminal can transmit the uplink signal through the path constituted by using the transmission beam ID and the reception beam ID which are unicasted.

Figure 7:
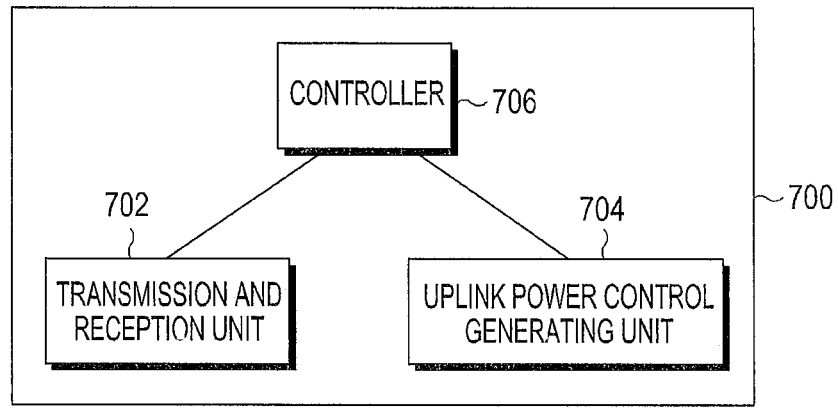
FIG. 7 is an example block diagram illustrating a structure of the base station according to this disclosure.

FIG. 7 is an example block diagram illustrating a structure of the base station according to this disclosure.

Referring to FIG. 7, the base station 700 can include a transmission and reception unit 702, an uplink power control generating unit 704 and a controller 706.

The transmission and reception unit 702 can transmit uplink power control information according to at least the first, second, third, and fourth embodiments described above to the corresponding terminal. Then, the controller 706 can control the uplink power control generating unit 704 to generate corresponding uplink power control information. The uplink power control information can duplicate the previous description, and thus the description of the uplink power control information will be omitted. Continuously, the controller 706 can transmit the uplink power control information generated through the uplink power control generating unit 704 to the terminal through the transmission and reception unit 702. In this case, the controller 706 can determine whether it unicasts or broadcasts corresponding information which the uplink power control information includes through a broadcasting or control channel to the terminal, and can control a transmission operation of the transmission and reception unit 702 to transmit the corresponding information according to the determined transmission scheme. Unicasted and broadcasted information among the uplink power control information can be duplicated using the above description, and thus the description of the unicasted and broadcasted information will be omitted.

Figure 8:
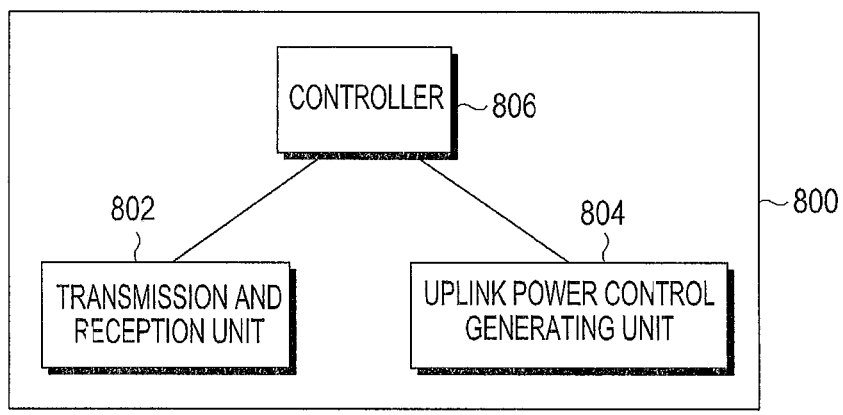
FIG. 8 is an example block diagram illustrating a structure of the terminal according to this disclosure.

FIG. 8 is an block diagram illustrating a structure of the terminal according to this disclosure.

Referring to FIG. 8, the terminal 800 can include a transmission and reception unit 802, an uplink power calculating unit 804 and a controller 806.

The transmission and reception unit 802 can receive uplink power control information according to at least the first, second, third, and fourth embodiments described above from the base station. Then, the controller 806 can control the uplink power calculating unit 804 to calculate the uplink power based on the uplink power control information. Particularly, the uplink power calculating unit 804 can calculate the uplink power by using the reception beam ID of the terminal and the NI of each reception beam corresponding to the reception ID in the uplink power control information using the average NI offset and the average NI mapped to the reception beam ID of the terminal, or can apply the NI offset of the transmission beam to the transmission beam ID and the NI or the average NI of each reception beam mapped to the transmission beam ID.

Continuously, when the controller 806 receives the uplink scheduling information through the transmission and reception unit 802, the controller 806 can transmit the uplink signal to the base station through the path constituted by using at least one of the reception beam ID and the transmission beam ID which are obtained through the calculated uplink transmission power and the uplink power control information.

Here, the structure of the base station 700 and the terminal 800 is merely an example of a schematic structure according to this disclosure for the convenience of the description, and can be a subdivisible structure or a different structure according to an intention of an enterpriser or the embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to control power of an uplink, at a base station, in a wireless communication system, the method comprising:
generating power control information for reception beams of the base station based on signals received using the reception beams;
transmitting, to a terminal, the power control information;
transmitting, to the terminal, a reception beam identifier of a reception beam determined among the reception beams; and receiving, from the terminal, a signal transmitted using a transmission power which is determined based on the reception beam identifier and the power control information.

2. The method as claimed in claim 1, wherein the generating comprises:
measuring a noise and interference (NI) value corresponding to each of the reception beams based on the signals received over the reception beams.

3. The method as claimed in claim 2, wherein the power control information includes information related to the NI values.

4. The method as claimed in claim 2, wherein the power control information:
includes an average NI value of the reception beams and an NI offset of the reception beam mapped to the determined reception beam identifier, the NI offset indicating a difference between an NI value of the reception beam and the average NI value.

5. The method as claimed in claim 1, further comprising:
if the terminal includes a plurality of transmission beams, determining at least one reception beam for each of the plurality of transmission beams from the reception beams.

6. A method to control power of an uplink at a terminal in a wireless communication system, the method comprising:
receiving, from a base station, power control information generated based on signals received using reception beams of the base station;
receiving, from the base station, a reception beam identifier of a reception beam determined among the reception beams;
determining a transmission power of a signal based on the reception beam identifier and the power control information; and
transmitting the signal to the base station using the determined transmission power.

7. The method of as claimed in claim 6, wherein determining the transmission power comprises:
obtaining information related to a noise and interference (NI) value of the reception beams mapped to the reception beam identifier among NI values of the reception beams included in the power control information; and
determining the transmission power based on the information related to the NI value of the reception beam.

8. The method as claimed in claim 6, wherein the power control information includes information related to noise and interference (NI) values measured corresponding to each of the reception beams.

9. The method as claimed in claim 6, wherein determining the transmission power comprises:
obtaining an average noise and interference (NI) value of the reception beams and an NI offset of the reception beam mapped to the reception beam identifier included in the power control information; and
determining the transmission power based on the NI offset.

10. The method as claimed in claim 6, wherein the power control information includes an average noise and interference (NI) value of the reception beams and an NI offset of the reception beam mapped to the reception beam identifier, the NI offset indicating a difference between an NI value of the reception beam and the average NI value.

11. The method as claimed in claim 6, wherein if the terminal includes a plurality of transmission beams, receiving, from the base station, information related to at least one reception beam corresponding to each of the plurality of transmission beams from the reception beams.

12. A base station to control power of an uplink in a wireless communication system, the base station comprising:
a controller configured to generate power control information for reception beams of the base station based on signal received by the reception beams;
a transceiver configured to:
transmit, to a terminal, the power control information, and
transmit, to the terminal, a reception beam identifier of a reception beam determined among the reception beams, and
receive, a signal transmitted using a transmission power that is determined based on the reception beam identifier and the power control information from the terminal.

13. The base station as claimed in claim 12, wherein the controller is configured to measure a noise and interference (NI) value corresponding to each of the reception beams based on the signals received over the reception beams.

14. The base station as claimed in claim 13, wherein the power control information includes information related to the measured NI values.

15. The base station as claimed in claim 13, wherein the power control information includes an average NI value of the reception beams and an NI offset of the reception beam mapped to the determined reception beam identifier, the NI offset indicating a difference between an NI value of the reception beam and the average NI value.

16. The base station as claimed in claim 12, wherein the controller is further configured to: if the terminal includes a plurality of transmission beams, determine at least one reception beam for each of the plurality of transmission beams from the reception beams.

17. A terminal to control power of an uplink in a wireless communication system, the terminal comprising:
a transceiver configured to receive, from a base station, power control information generated based on signals received using reception beams of the base station, and receive, from the base station, a reception beam identifier of a reception beam determined among the reception beams; and
a controller configured to:
determine a transmission power of a signal based on the reception beam identifier and the power control information, and
control the transceiver to transmit the signal to the base station using the determined transmission power.

18. The terminal as claimed in claim 17, wherein the controller is configured to obtain information related to a noise and interference (NI) value of the reception beam mapped to the reception beam identifier among NI values of the reception beams included in the power control information, and determine the transmission power based on the information related to an NI value of the reception beam.

19. The terminal as claimed in claim 17, wherein the power control information includes information related to noise and interference (NI) values measured corresponding to each of the reception beams.

20. The terminal as claimed in claim 17, wherein the controller is configured to obtain an average noise and interference (NI) value of the reception beams and an NI offset of a reception beam mapped to the reception beam identifier included in the power control information, and determine the transmission power based on the NI offset.

21. The terminal as claimed in claim 17, wherein the power control information includes an average noise and interference (NI) value of the reception beams and an NI offset of the reception beam mapped to the reception beam identifier, the NI offset indicating a difference between an NI value of the reception beam and the average NI value.

22. The terminal as claimed in claim 17, wherein the transceiver is configured to: if the terminal includes a plurality of transmission beams, receive, from the base station, at least one reception beam corresponding to each of the plurality of transmission beams.

* * * * *